United States Patent
Barry

(10) Patent No.: US 11,722,049 B2
(45) Date of Patent: Aug. 8, 2023

(54) INDUCTOR CURRENT RECONSTRUCTION

(71) Applicant: AES Global Holdings PTE Ltd., Singapore (SG)

(72) Inventor: Brendan Barry, Denver, CO (US)

(73) Assignee: AES Global Holdings PTE Ltd., Singapore (SG)

( * ) Notice: Subject to any disclaimer, the term of this patent is extended or adjusted under 35 U.S.C. 154(b) by 185 days.

(21) Appl. No.: 17/372,785

(22) Filed: Jul. 12, 2021

(65) Prior Publication Data

US 2023/0016789 A1    Jan. 19, 2023

(51) Int. Cl.
*H02M 1/00* (2006.01)
*H02M 1/08* (2006.01)
*H02M 3/155* (2006.01)

(52) U.S. Cl.
CPC ....... *H02M 1/0048* (2021.05); *H02M 1/0009* (2021.05); *H02M 1/08* (2013.01); *H02M 3/155* (2013.01)

(58) Field of Classification Search
CPC ...... H02M 1/0009; H02M 3/155; H02M 1/32; H02M 3/156
See application file for complete search history.

(56) References Cited

U.S. PATENT DOCUMENTS

| | | | |
|---|---|---|---|
| 8,049,523 B2 | 11/2011 | Gazit | |
| 11,451,129 B1* | 9/2022 | Ryan | H02M 1/0006 |
| 2006/0113975 A1* | 6/2006 | Mednik | H02M 1/4208 323/282 |
| 2010/0327838 A1* | 12/2010 | Melanson | H02M 3/156 323/311 |
| 2016/0301321 A1* | 10/2016 | Ng | G05F 1/13 |

* cited by examiner

*Primary Examiner* — Kyle J Moody

(57) ABSTRACT

In the parallel operation of power supply units, a high line ripple current may be observed in output when the power supply units (PSUs) are supplied with different inputs. For example, a high line ripple current may be observed when PSUs were supplied with different line frequency inputs and/or when PSUs were supplied with different phase angle input lines. A low pass filter is in a control loop which is capable of filtering the line frequency to get an average current reference signal. The average current reference signal is compared with the real time output current to generate an error signal. This error signal is fed back to a voltage control loop to adjust the output in order to compensate the line ripple.

20 Claims, 5 Drawing Sheets

```
┌─────────────────────────────────────────────────────────────┐
│   USE A CONTROLLED SWITCHING DEVICE, INDUCING A PRIMARY     │
│        INDUCTOR TO CARRY A FIRST VARYING CURRENT            │
│                           302                               │
└─────────────────────────────────────────────────────────────┘
                              │
┌─────────────────────────────────────────────────────────────┐
│   ELECTROMAGNETICALLY COUPLING THE PRIMARY INDUCTOR WITH A  │
│   SECONDARY INDUCTOR TO INDUCE A SECOND VARYING CURRENT     │
│   THAT IS SUBSTANTIALLY LESS THAN THE FIRST VARYING CURRENT │
│   IN THE SECONDARY INDUCTOR AND TO INDUCE THE SECONDARY     │
│   INDUCTOR TO PRODUCE A FIRST VARYING VOLTAGE THAT IS       │
│   SUBSTANTIALLY PROPORTIONAL TO THE FIRST VARYING CURRENT   │
│                           304                               │
└─────────────────────────────────────────────────────────────┘
                              │
┌─────────────────────────────────────────────────────────────┐
│   SENSE A SECOND VARYING VOLTAGE THAT IS PROPORTIONAL TO    │
│   THE LOW FREQUENCY VARYING CURRENT BEING SUPPLIED TO A     │
│   LOAD OF THE SWITCHED-MODE POWER SUPPLY                    │
│                           306                               │
└─────────────────────────────────────────────────────────────┘
                              │
┌─────────────────────────────────────────────────────────────┐
│   BASED ON THE SECOND VARYING VOLTAGE AND THE FIRST VARYING │
│   VOLTAGE, CONTROLLING THE CONTROLLED SWITCHING DEVICE.     │
│                           308                               │
└─────────────────────────────────────────────────────────────┘
```

*FIG. 3*

INDUCTOR CURRENT RECONSTRUCTION

TECHNICAL FIELD

Aspects of the disclosure are related to the field of power supply units, and in particular, to sensing AC current ripple through the inductor in switched-mode power supplies.

BACKGROUND

This section provides background information related to the present disclosure which is not necessarily prior art.

A power supply unit is an electrical device that supplies electric power to an electrical load. Indeed, power supply units typically have a power input connection, which receives energy in the form of electric current from a source, and one or more power output connections that deliver current to the load. The primary function of a power supply is to convert electric voltage and current from a source to a correct voltage, current, and frequency to power a load. Indeed, a power supply unit may perform a variety of functions, such as, but not limited to, power conversion, alternating current to direct current (AC-DC) or DC-DC conversion, adjusting voltage levels and ac frequency, and providing backup power during power grid outages.

Switched-mode power supplies may require a measurement of the AC current ripple flowing through an inductor. This measurement may be used for safety (i.e., overcurrent) purposes and/or as part of a closed-loop feedback control loop. Thus, for cost reasons, an accurate measurement of AC current ripple using components that minimize cost, size, and/or power loss is desirable.

SUMMARY

One or more embodiments described herein, among other benefits, solve one or more of the foregoing or other problems in the art by providing systems, methods, and non-transitory computer readable media for reducing the current ripple of power supplies connected in parallel. In some implementations, the technology described includes a switched-mode power supply, comprising: a primary inductor to carry a first varying current in response to a controlled switching device; a secondary inductor electromagnetically coupled with the primary inductor to carry a second varying current that is substantially less than the first varying current and to produce a first varying voltage that is substantially proportional to the first varying current; a current sense element to produce a second varying voltage that is proportional to a low frequency varying current being supplied to a load of the switched-mode power supply; and, control circuitry to receive the second varying voltage and the first varying voltage and to, based on the second varying voltage and the first varying voltage, control the controlled switching device.

In some implementations, the technology described includes a method of controlling a switched-mode power supply, comprising: using a controlled switching device, inducing a primary inductor to carry a first varying current; electromagnetically coupling the primary inductor with a secondary inductor electromagnetically to induce a second varying current that is substantially less than the first varying current in the secondary inductor and to induce the secondary inductor to produce a first varying voltage that is substantially proportional to the first varying current; sensing a second varying voltage that is proportional to a low frequency varying current being supplied to a load of the switched-mode power supply; and, based on the second varying voltage and the first varying voltage, controlling the controlled switching device.

In some implementations, the technology described includes a switched-mode power supply, comprising: a transformer having a primary winding and a secondary winding, the secondary winding configured to produce a first varying voltage that is substantially proportional to a varying current flowing in the primary winding; a current sense element to produce a second varying voltage that is proportional to a low frequency varying current being supplied to a load of the switched-mode power supply; and, control circuitry configured to receive a first varying voltage and a second varying voltage and to, based on the first varying voltage and the second varying voltage, control a switching device that induces current changes in the primary winding.

Additional features and advantages of the present application will be set forth in the description which follows, and in part will be obvious from the description, or may be learned by the practice of such example embodiments.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not considered to be limiting of its scope. Implementations will be described and explained with additional specificity and detail through the use of the accompanying drawings.

FIG. 3 is a flowchart illustrating a method of operating a switched-mode power supply system.

Figure 1:
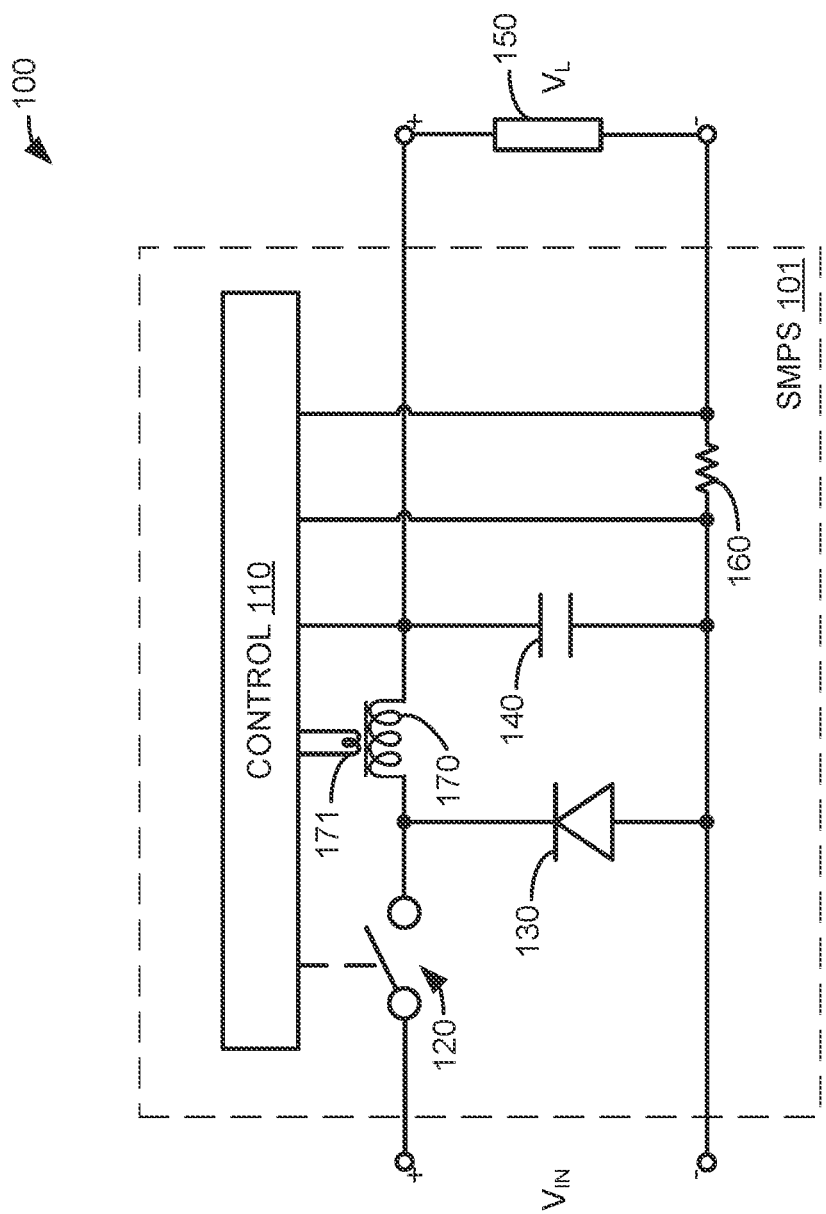
FIG. 1 is a diagram illustrating inductor current reconstruction with a buck topology switched-mode power supply system.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Example implementations are provided so that this disclosure will be thorough. and will fully convey the scope to persons skilled in the art. Numerous specific details are set forth such as examples of specific components, devices, and methods, to provide a thorough understanding of implementations of the present disclosure. It will be apparent to those skilled in the art that specific details need not be employed, that example implementations may be embodied in many different forms and that neither should be construed to limit the scope of the disclosure. In some example implementations, well-known processes, well-known device structures, and well-known technologies are not described in detail.

The terminology used herein is for the purpose of describing particular example implementations only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper." and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In an embodiment, the high-frequency (a.k.a., AC ripple) and low-frequency (a.k.a., DC current) components of the inductor current in a switched-mode power supply are monitored. The high-frequency component of the current in the switched-mode power supply inductor is monitored by a secondary winding electromagnetically coupled to the main inductor of the power supply. The number of turns in the secondary (monitor) inductor is low relative to the number of windings in the primary (main) inductor. This ratio helps reduce losses across the primary inductor due to the secondary inductor, as well as keep voltage stresses low. The voltage across the secondary winding is used as part of the control loop of the power supply.

In an embodiment, a series resistor-capacitor (RC) circuit is used across the terminals of the secondary inductor. This allows the rate of change of the primary inductor current to be reflected by the voltage across the capacitor of the RC circuit. The voltage across the RC circuit may be combined with a voltage indicating the low-frequency current through the load on the power supply. This combined voltage may be provided to a control circuit of the power supply to form a closed-loop system that is based on both the low-frequency (DC load) current and the high-frequency (transient and AC ripple) current components flowing through the main inductor of the power supply.

FIG. 1 is a diagram illustrating inductor current reconstruction with a buck topology switched-mode power supply system. In FIG. 1, buck topology switched-mode power supply system 100 comprises control 110, controlled switch 120, diode 130, capacitor 140, load 150. DC current sense resistor 160, main inductor 170, and secondary inductor 171. It should be understood that control 110, controlled switch 120, diode 130, capacitor 140, DC current sense resistor 160, main inductor 170, and secondary inductor 171 (i.e., without load 150) comprise a switched mode power supply 101 that receives an input supply voltage $V_{IN}$ and provides an output voltage $V_L$ to load 150.

In FIG. 1, the positive terminal of input supply voltage $V_{IN}$ is provided to a first terminal of controlled switch 120. A second terminal of controlled switch 120 is connected to the cathode of diode 130 and a first terminal of main inductor 170. The anode of diode 130 is connected to the negative terminal of supply voltage $V_{IN}$. Controlled switch 120 is controlled by control 110 to selectively open and close switch 120 thereby selectively applying $V_{IN}$ to diode 110 and the first terminal of main inductor 170.

A second terminal of main inductor 170 is connected to a first terminal of capacitor 140, a first terminal of load 150, and is coupled to control 110. This allows control 110 to monitor the voltage $V_L$ across load 150. Secondary inductor 171 is electromagnetically coupled with main inductor 170. Secondary inductor 171 is coupled with main inductor 170 in a manner such that varying currents in primary inductor 170 induce correspondingly varying currents (and/or voltages when the varying currents flow through a load, or vice versa) across the terminals of secondary inductor 171. The terminals of secondary inductor 171 are coupled to control 110 to allow control 110 to monitor the current variations in main inductor 170.

Secondary inductor 171 may be electromagnetically coupled to main inductor 170 as a secondary winding to the core of main inductor 170. It should be understood that the configuration of main inductor 170 and secondary inductor 171 substantially form a high-leakage inductance transformer. In an embodiment, the ratio of the number of windings (Ns) of secondary inductor 171 to the number of windings (Np) of main inductor 170 is low (e.g., less than or equal to 1:10) in order to reduce the voltage drop across main inductor 170.

A second terminal of load 150 is connected to a first terminal of DC (and/or low-frequency) current sense resistor 160. The second terminal of sense resistor 160 is connected to the negative terminal of supply voltage $V_{IN}$. Physically, to ensure accurate current sensing, sense resistor 160 should be connected between the second terminal of capacitor 140 and the load 150.

In an embodiment, control 110 uses the varying voltages/currents across/through secondary inductor 171 to monitor the AC (high-frequency) component of the current flowing through primary inductor 170. Control 110 also uses the voltage across sense resistor 160 to monitor the DC (low-frequency) component of the current flowing through load 150. Finally, control 110 uses the voltage across load 150 to monitor the output voltage of SMPS 101. Based on monitoring these voltages and/or currents, control 110 modulates (e.g., using pulse-width modulation—PWM) the on-off switching of controlled switch 120. Control 110 modulates the on-off switching of controlled switch 120 to provide load 150 with a constant voltage $V_L$ and/or limit the current flowing to load 150 from SMPS 101 (e.g., to prevent an overcurrent and/or unsafe condition).

It should be understood that control 110 may be implemented using analog circuitry (e.g., op-amps, resistor, capacitors, etc.), digital circuitry (e.g., analog-to-digital converters, microprocessor(s), and/or firmware), or both. For example, each of the monitored parameters described herein may be converted to a digital indicator (e.g., value) and then processed by firmware running on a microprocessor to determine the on-off switching of controlled switch 120. In another example, one or more of the parameters described herein may be combined by analog circuitry to provide a feedback signal that is used as part of an analog (or mixed analog and digital) feedback loop to determine the on-off switching of controlled switch 120.

Figure 2:
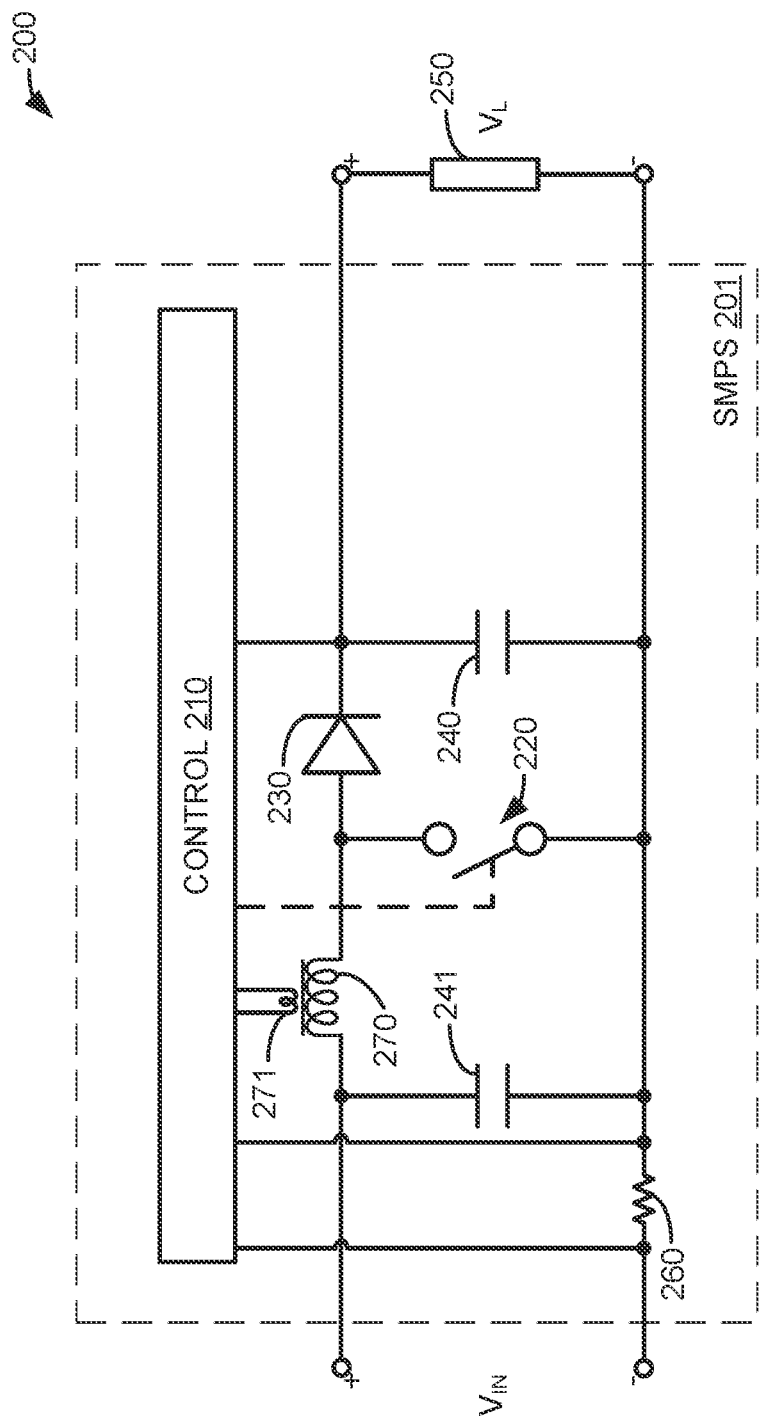
FIG. 2 is a diagram illustrating inductor current reconstruction with a boost topology switched-mode power supply system.

FIG. 2 is a diagram illustrating inductor current reconstruction with a boost topology switched-mode power supply system. In FIG. 2, boost topology switched-mode power supply system 200 comprises control 210, controlled switch 220, diode 230, capacitor 240, capacitor 241, load 250, DC current sense resistor 260, main inductor 270, and secondary inductor 271. It should be understood that control 210, controlled switch 220, diode 230, capacitor 240, DC current sense resistor 260, main inductor 270, and secondary inductor 271 (i.e., without load 250) comprise a switched mode power supply 201 that receives an input supply voltage $V_{IN}$ and provides an output voltage $V_L$ to load 250.

In FIG. 2, the positive terminal of supply voltage $V_{IN}$ is provided to a first terminal of main inductor 270 and a first terminal of capacitor 241. A second terminal of main inductor 270 is connected to the anode of diode 230 and a first terminal of controlled switch 220. Controlled switch 220 is controlled by control 210 to selectively open and close switch 220 thereby selectively drawing current from the positive terminal of $V_{IN}$ through main inductor 270 to the negative terminal of $V_L$ across load 250. The anode of diode 230 is connected to a first terminal of capacitor 240, a first (positive) terminal of load 250, and is coupled to control 210. This allows control 210 to monitor the voltage $V_L$ across load 250. The second terminals of capacitor 240 and capacitor 241 are connected to a second (negative) terminal of load 250.

Secondary inductor 271 is electromagnetically coupled with main inductor 270. Secondary inductor 271 is coupled with main inductor 270 in a manner such that varying currents in primary inductor 270 induce correspondingly varying currents (and/or voltages when the varying currents flow through a load, or vice versa) across the terminals of secondary inductor 271. The terminals of secondary inductor 271 are coupled to control 210 to allow control 210 to monitor the current variations in main inductor 270.

Secondary inductor 271 may be electromagnetically coupled to main inductor 270 as a secondary winding to the core of main inductor 270. It should be understood that the configuration of main inductor 270 and secondary inductor 271 substantially form a high-leakage inductance transformer. In an embodiment, the ratio of the number of windings (Ns) of secondary inductor 271 to the number of windings (Np) of main inductor 270 is low (e.g., less than or equal to 2:10) in order to reduce the voltage drop across main inductor 270.

A second terminal of load 250 is connected to a first terminal of DC (and/or low-frequency) current sense resistor 260. The second terminal of sense resistor 260 is connected to the negative terminal of supply voltage $V_{IN}$.

In an embodiment, control 210 uses the varying voltages/currents across/through secondary inductor 271 to monitor the AC (high-frequency) component of the current flowing through primary inductor 270. Control 210 also uses the voltage across sense resistor 260 to monitor the DC (low-frequency) component of the current flowing through load 250. Finally, control 210 uses the voltage across load 250 to monitor the output voltage of SMPS 201. Based on monitoring these voltages and/or currents, control 210 modulates (e.g., using pulse-width modulation—PWM) the on-off switching of controlled switch 220. Control 210 modulates the on-off switching of controlled switch 220 to provide load 250 with a constant voltage $V_L$ and/or limit the current flowing to load 250 from SMPS 201 (e.g., to prevent an overcurrent and/or unsafe condition).

It should be understood that control 210 may be implemented using analog circuitry (e.g., op-amps, resistor, capacitors, etc.), digital circuitry (e.g., analog-to-digital converters, microprocessor(s), and/or firmware), or both. For example, each of the monitored parameters described herein may be converted to a digital indicator (e.g., value) and then processed by firmware running on a microprocessor to determine the on-off switching of controlled switch 220. In another example, one or more of the parameters described herein may be combined by analog circuitry to provide a feedback signal that is used as part of an analog (or mixed analog and digital) feedback loop to determine the on-off switching of controlled switch 220.

FIG. 3 is a flowchart illustrating a method of operating a switched-mode power supply system. The steps illustrated in FIG. 3 may be performed by power supply system 100, power supply system 200, power supply system 400, and/or their components. A controlled switching device is used to induce a primary inductor to carry a first varying current (302). For example, controlled switching device 120 may be controlled by control 110 to alternately switch on and off thereby alternately applying a voltage across inductor 170 thereby inducing a varying current in inductor 170.

The primary inductor is electromagnetically coupled with a secondary inductor to induce a second varying current that is substantially less than the first varying current in the secondary inductor and to induce the secondary inductor to produce a first varying voltage that is substantially proportional to the first varying current (304). For example, secondary inductor 171 is electromagnetically coupled with main inductor 170. Secondary inductor 171 is coupled with main inductor 170 in a manner such that varying currents in primary inductor 170 induce correspondingly varying currents (and/or voltages when the varying currents flow through a load in control 110, or vice versa) across the terminals of secondary inductor 171. The ratio of the number of windings (Ns) of secondary inductor 171 to the number of windings (Np) of main inductor 170 may be low (e.g., less than or equal to 1:10) in order to ensure the varying current through secondary inductor 171 is substantially less than the varying current through primary inductor 170.

A second varying voltage that is proportional to the low-frequency varying current being supplied to a load of the switched-mode power supply is sensed (306). For example, control 110 may use the voltage across sense resistor 160 to monitor the DC (low-frequency) component of the current flowing through load 150.

Based on the second varying voltage and the first varying voltage, the controlled switching device is controlled (308). For example, control 110 may use the varying voltages/currents across/through secondary inductor 171 to monitor the AC (high-frequency) component of the current flowing through primary inductor 170 and also use the voltage across sense resistor 160 to monitor the DC (low-frequency) component of the current flowing through load 150. Based at least on monitoring these voltages and/or currents, control 110 modulates (e.g., using pulse-width modulation—PWM) the on-off switching of controlled switch 120. Control 110 modulates the on-off switching of controlled switch 120 to provide load 150 with a constant voltage $V_L$ and/or limit the current flowing to load 150 from SMPS 101 (e.g., to prevent an overcurrent and/or unsafe condition).

Figure 4:
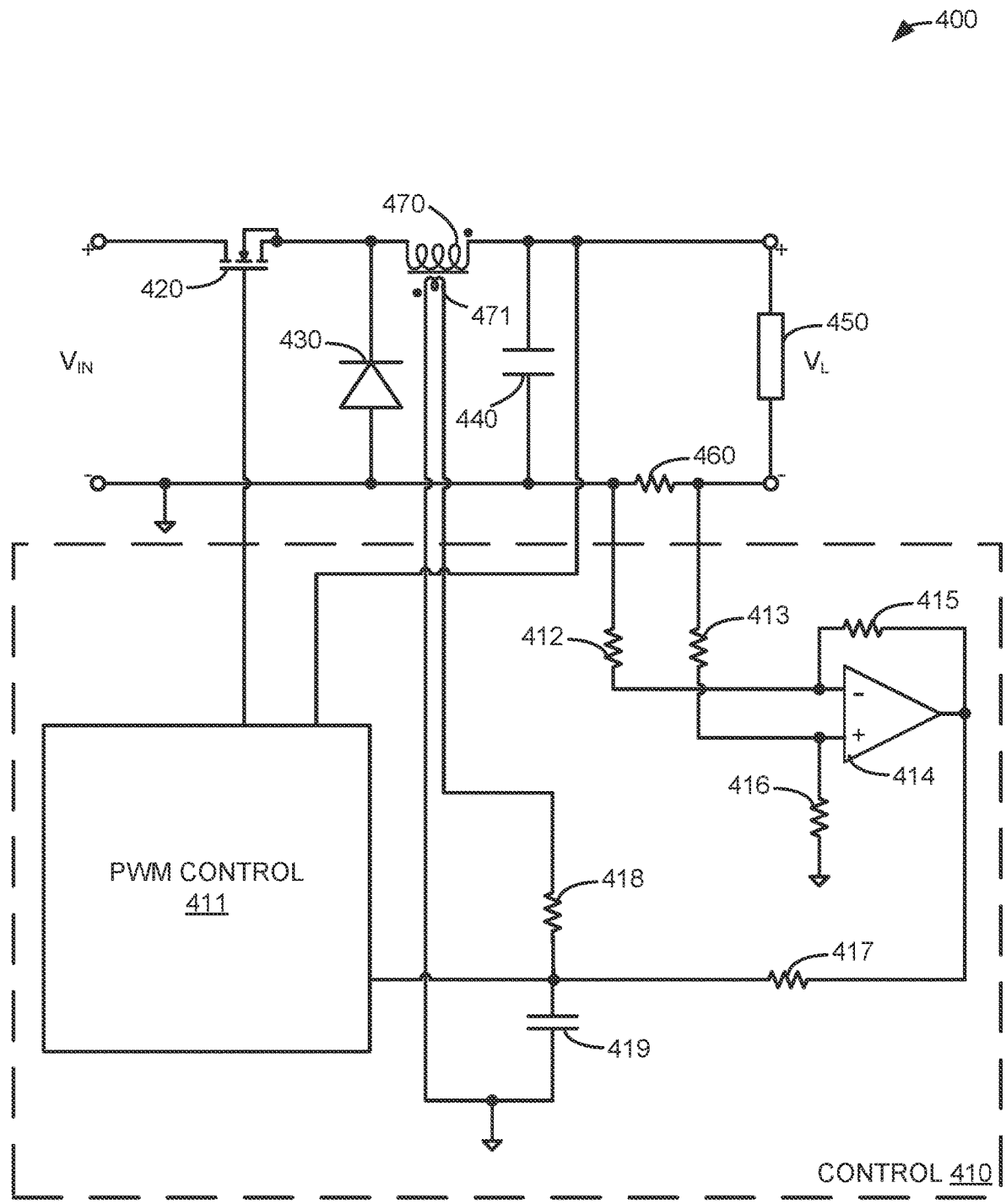
FIG. 4 is a diagram illustrating a combined low-high frequency current feedback switched-mode power supply system.

FIG. 4 is a diagram illustrating a combined low-high frequency current feedback switched-mode power supply system. In FIG. 4, switched-mode power supply system 400 comprises control 410, controlled transistor 420, diode 430, capacitor 440, load 450, DC current sense resistor 460, main inductor 470, and secondary inductor 471. Control 410 includes pulse-width modulation control 411, resistor 412, resistor 413, operation amplifier 414, resistor 415, resistor 416, resistor 417, resistor 418, and capacitor 419. It should be understood that system 400 receives an input supply voltage $V_{IN}$ and provides an output voltage $V_L$ to load 450.

In FIG. 4, the positive terminal of input supply voltage $V_{IN}$ is provided to a first terminal of controlled transistor 420. A second terminal of controlled transistor 420 is connected to the cathode of diode 430 and a first terminal of main inductor 470. The anode of diode 430 is connected to the negative terminal of supply voltage $V_{IN}$. Controlled transistor 420 is controlled by control 110 (and PWM control 411, in particular) to selectively turn on and turn off transistor 420 thereby selectively applying $V_{IN}$ to diode 410 and the first terminal of main inductor 470.

A second terminal of main inductor 470 is connected to a first terminal of capacitor 440, a first terminal of load 450, and is coupled to control 410. This allows control 410 to monitor the voltage $V_L$ across load 450. Secondary inductor 471 is electromagnetically coupled with main inductor 470. Secondary inductor 471 is coupled with main inductor 470 in a manner such that varying currents in primary inductor 470 induce correspondingly varying currents (and/or voltages when the varying currents flow through a load, or vice versa) across the terminals of secondary inductor 471. The terminals of secondary inductor 471 are coupled across a series resistor-capacitor (RC) network formed by resistor 418 and capacitor 419. The node between resistor 418 and capacitor 419 is connected to PWM control 411.

A first terminal of resistor 412 is connected to the negative terminal of the input power supply voltage $V_{IN}$. The second terminal of resistor 412 is connected to the inverting input of op-amp 414. A first terminal of resistor 413 is connected to the negative terminal of the output voltage $V_L$. The second terminal of resistor 413 is connected to the non-inverting input of op-amp 414. Resistor 415 is connected between the output of op-amp 414 and the inverting input of op-amp 414. Resistor 416 is connected between the non-inverting input of op-amp 414 and the negative reference voltage (i.e., negative terminal of $V_{IN}$).

It should be understood that resistors 412413, op-amp 414, and resistors 415416 form an amplifier that outputs a voltage that is proportional to the voltage across sense resistor 460. Since the voltage across sense resistor 460 is proportional to the current flowing through sense resistor 460 (and load 450), the voltage at the output of op-amp 414 is proportional to the DC current flowing through load 450.

The output of op-amp 414 is connected to a first terminal of resistor 417. The second terminal of resistor 417 is connected to the node between resistor 418 and capacitor 419. Thus, it should be understood that the voltage at the node between resistor 418 and capacitor 419 that is provided to PWM control 411 is the sum of the AC current sensed by secondary inductor 471 and the DC current sensed by sense resistor 460.

The system illustrated in FIG. 4 measures the AC inductor current ripple flowing the primary inductor 170. For the purposes of the following discussion: the inductance of primary inductor 170 is referred to as $L_P$; the current flowing through primary inductor 170 is referred to as $I_{LP}$; the voltage across primary inductor 170 is referred to as $V_{LP}$; the voltage across secondary inductor 171 is referred to as $V_{LS}$; the voltage across capacitor 419 is referred to as $V_{sense}$; the resistance of resistor 418 is referred to a $R_s$; the capacitance of capacitor 419 is referred to as $C_s$; the value of sense resistor 460 is referred to as $R_{sense}$; and, the resistor 417 between the output of op-amp 414 and the node between resistor 418 and capacitor 419 is referred to as $R_{high}$.

As discussed herein and illustrated in FIG. 4, secondary inductor 471 is connected to an RC circuit formed by resistor 418 and capacitor 419. The effective turns ratio of the transformer formed by primary inductor 470 and secondary inductor 471 is given by:

$$N = K\sqrt{\frac{L_s}{L_p}}$$

Where K is the coupling factor of the windings. When controlled transistor 420 is turned on, the voltage across primary inductor 470 is $V_{IN}$–$V_{OUT}$. Thus:

$$V_{IN} - V_{OUT} = V_{LP} = L_P \frac{dI_{LP}}{dt}$$

Due to the transformer action, the voltage across the terminals of secondary inductor 471 is:

$$VL_s = NV_{Lp}$$

The change in voltage $V_{sense}$ across capacitor 419 is:

$$\frac{dV_{sense}}{dt} = \frac{V_{Ls}}{R_s C_s} = \frac{NV_{LP}}{R_s C_s} = \frac{L_p N}{R_s C_s} \frac{dI_{Lp}}{dt}$$

Since the change in time dt is the same for both the primary inductor 470 current change and the capacitor 419 voltage change, the peak-to-peak change of the capacitor 419 voltage is directly proportional to the peak-to-peak change in the primary inductor 470 via the relation:

$$\Delta V_{sense(p-p)} = \frac{L_p N}{R_s C_s} \Delta I_{Lp(p-p)}$$

Note from the preceding equation that the sense gain is independent of duty cycle and switching frequency. Thus, the sense gain can also be increased or reduced without affecting the main power circuit by changing value(s) of resistor 418 and/or capacitor 419.

Sense resistor 460 is connected in series with the return current from load 450. Op-amp 414 and associated resistors form a differential amplifier that amplifies the voltage across sense resistor 460. The output of op-amp 414 is connected to the AC measured current signal at the node between resistor 418 and capacitor 419 via resistor 417. The combination of resistor 417 and resistor 418 form a voltage divider for the DC measured current signal from op-amp 414. Thus, in an embodiment, the total gain of resistor 418, op-amp 414 circuit, and the resistive divider formed by resistor 417 and resistor 418 should be selected to be equivalent to the gain of AC measuring circuit formed by secondary inductor 471, resistor 418, and capacitor 418. Also, the time constant of the RC circuit should be much longer than the switching cycle time to ensure capacitor 419 remains in the linear region of operation and does not fully charge or discharge.

TABLE 1

Table 1 gives example values for the circuit illustrated in FIG. 4.

| Element | Value | Units |
|---|---|---|
| $L_{570} = L_P$ | 35.5 | µH |
| $L_{571} = L_S$ | 810.7 | nH |
| N | 0.151 | |
| $R_{560} = R_{sense}$ | 15 | mΩ |
| $R_{515} = R_{516} = R_{f1}$ | 240 | kΩ |
| $R_{512} = R_{513} = R_{in1}$ | 11 | kΩ |
| $R_{517} = R_{high}$ | 51 | kΩ |
| $R_{518} = R_s$ | 10 | kΩ |
| $C_{519} = C_s$ | 10 | nF |

The circuit parameter values given in Table 1 result in the following gains for the DC and AC sense circuits:

$$\text{ac\_gain} = \frac{L_P K N}{R_s C_s} = 0.053647$$

$$dc_{gain} = \frac{R_{sense} R_{f1} R_s}{R_{in_1}(R_{high} + R_s)} = 0.053651$$

Figure 5:
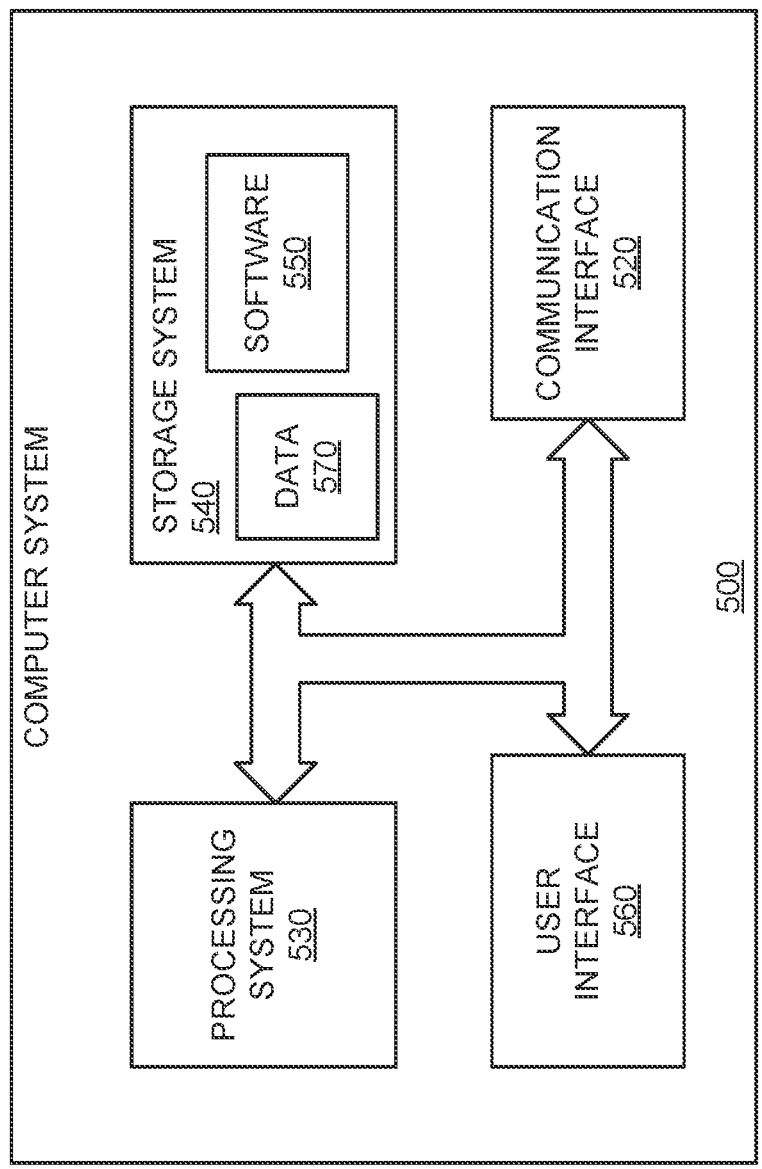
FIG. 5 is a block diagram illustrating a computer system.

FIG. 5 is a block diagram illustrating a computer system. In an embodiment, computer system 500 and/or its components include circuits, software, and/or data that implement, or are used to implement, the methods, systems and/or devices illustrated in the Figures, the corresponding discussions of the Figures, and/or are otherwise taught herein. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of power supply system 100, power supply system 200, power supply system 400, and/or their components. These software descriptions may be: behavioral, register transfer, logic component, transistor, and layout geometry-level descriptions.

Data formats in which such descriptions may be implemented are stored on a non-transitory computer readable medium include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Physical files may be implemented on non-transitory machine-readable media such as: 4 mm magnetic tape, 8 mm magnetic tape, 3-½-inch floppy media, CDs, DVDs, hard disk drives, solid-state disk drives, solid-state memory, flash drives, and so on.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), multi-core processors, graphics processing units (GPUs), etc.

FIG. 5 illustrates a block diagram of an example computer system. Computer system 500 includes communication interface 520, processing system 530, storage system 540, and user interface 560. Processing system 530 is operatively coupled to storage system 540. Storage system 540 stores software 550 and data 570. Processing system 530 is operatively coupled to communication interface 520 and user interface 560. Computer system 500 may comprise a programmed general-purpose computer. Computer system 500 may include a microprocessor. Computer system 500 may comprise programmable or special purpose circuitry. Computer system 500 may be distributed among multiple devices, processors, storage, and/or interfaces that together comprise elements 520-570.

Communication interface 520 may comprise a network interface, modem, port, bus, link, transceiver, or other communication device. Communication interface 520 may be distributed among multiple communication devices. Processing system 530 may comprise a microprocessor, microcontroller, logic circuit, or other processing device. Processing system 530 may be distributed among multiple processing devices. User interface 560 may comprise a keyboard, mouse, voice recognition interface, microphone and speakers, graphical display, touch screen, or other type of user interface device. User interface 560 may be distributed among multiple interface devices. Storage system 540 may comprise a disk, tape, integrated circuit, RAM, ROM, EEPROM, flash memory, network storage, server, or other memory function. Storage system 540 may include computer readable medium. Storage system 540 may be distributed among multiple memory devices.

Processing system 530 retrieves and executes software 550 from storage system 540. Processing system 530 may retrieve and store data 570. Processing system 530 may also retrieve and store data via communication interface 520. Processing system 550 may create or modify software 550 or data 570 to achieve a tangible result. Processing system may control communication interface 520 or user interface 560 to achieve a tangible result. Processing system 530 may retrieve and execute remotely stored software via communication interface 520.

Software 550 and remotely stored software may comprise an operating system, utilities, drivers, networking software, and other software typically executed by a computer system. Software 550 may comprise an application program, applet, firmware, or other form of machine-readable processing instructions typically executed by a computer system. When executed by processing system 530, software 550 or remotely stored software may direct computer system 500 to operate as described herein.

Implementations discussed herein include, but are not limited to, the following examples:

Example 1: A switched-mode power supply, comprising: a primary inductor to carry a first varying current in response to a controlled switching device; a secondary inductor electromagnetically coupled with the primary inductor to carry a second varying current that is substantially less than the first varying current and to produce a first varying voltage that is substantially proportional to the first varying current; a current sense element to produce a second varying voltage that is proportional to a low frequency varying current being supplied to a load of the switched-mode power supply; and, control circuitry to receive the second varying voltage and the first varying voltage and to, based on the second varying voltage and the first varying voltage, control the controlled switching device.

Example 2: The switched-mode power supply of example 1, wherein the control circuitry further comprises: a summation circuit to combine the second varying voltage with the first varying voltage to produce a varying feedback voltage.

Example 3: The switched-mode power supply of example 1, wherein the control circuitry executes firmware that combines a second varying voltage indicator with a first varying voltage indicator to produce a varying feedback indicator.

Example 4: The switched-mode power supply of example 1, wherein the primary inductor and the controlled switching device are arranged in a buck converter topology.

Example 5: The switched-mode power supply of example 1, wherein the primary inductor and the controlled switching device are arranged in a boost converter topology.

Example 6: The switched-mode power supply of example 1, wherein the summation circuit is implemented using analog circuitry.

Example 7: The switched-mode power supply of example 1, wherein the secondary inductor is electromagnetically coupled with the primary inductor using a primary inductor to secondary inductor turns ration of more than ten (10).

Example 8: A method of controlling a switched-mode power supply, comprising: using a controlled switching device, inducing a primary inductor to carry a first varying current; electromagnetically coupling the primary inductor with a secondary inductor to induce a second varying current that is substantially less than the first varying current in the secondary inductor and to induce the secondary inductor to produce a first varying voltage that is substantially proportional to the first varying current; sensing a second varying voltage that is proportional to a low frequency varying current being supplied to a load of the switched-mode power supply; and, based on the second varying voltage and the first varying voltage, controlling the controlled switching device.

Example 9: The method of example 8, further comprising: summing the second varying voltage with the first varying voltage to produce a varying feedback voltage.

Example 10: The method of example 8, wherein control circuitry executes firmware that sums a second varying voltage indicator with a first varying voltage indicator to produce a varying feedback indicator.

Example 11: The method of example 8, wherein the primary inductor and the controlled switching device are arranged in a buck converter topology.

Example 12: The method of example 8, wherein the primary inductor and the controlled switching device are arranged in a boost converter topology.

Example 13: The method of example 9, wherein summing the second varying voltage with the first varying voltage is performed using analog circuitry.

Example 14: The method of example 8, wherein the secondary inductor is electromagnetically coupled with the primary inductor using a primary inductor to secondary inductor turns ration of more than ten (10).

Example 15: A switched-mode power supply, comprising: a transformer having a primary winding and a secondary winding, the secondary winding configured to produce a first varying voltage that is substantially proportional to a varying current flowing in the primary winding; a current sense element to produce a second varying voltage that is proportional to a low frequency varying current being supplied to a load of the switched-mode power supply; and, control circuitry configured to receive a first varying voltage and a second varying voltage and to, based on the first varying voltage and the second varying voltage, control a switching device that induces current changes in the primary winding.

Example 16: The switched-mode power supply of example 15, wherein the control circuitry further comprises; a summation circuit to combine the second varying voltage with the first varying voltage to produce a varying feedback voltage.

Example 17: The switched-mode power supply of example 15, wherein the control circuitry executes firmware that combines a second varying voltage indicator with a first varying voltage indicator to produce a varying feedback indicator.

Example 18: The switched-mode power supply of example 15, wherein the primary winding and the controlled switching device are arranged in a buck converter topology.

Example 19: The switched-mode power supply of example 15, wherein the primary winding and the controlled switching device are arranged in a boost converter topology.

Example 20: The switched-mode power supply of example 15, wherein the summation circuit is implemented using analog circuitry.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A switched-mode power supply, comprising:
a primary inductor to carry a first varying current in response to a controlled switching device;
a secondary inductor electromagnetically coupled with the primary inductor to carry a second varying current that is substantially less than the first varying current and to produce a first varying voltage that is substantially proportional to the first varying current;

a current sense element to produce a second varying voltage that is proportional to a low frequency varying current being supplied to a load of the switched-mode power supply; and, control circuitry to receive the second varying voltage and the first varying voltage and to, based on the second varying voltage and the first varying voltage, control the controlled switching device.

2. The switched-mode power supply of claim 1, wherein the control circuitry further comprises:

a summation circuit to combine the second varying voltage with the first varying voltage to produce a varying feedback voltage.

3. The switched-mode power supply of claim 1, wherein the control circuitry executes firmware that combines a second varying voltage indicator with a first varying voltage indicator to produce a varying feedback indicator.

4. The switched-mode power supply of claim 1, wherein the primary inductor and the controlled switching device are arranged in a buck converter topology.

5. The switched-mode power supply of claim 1, wherein the primary inductor and the controlled switching device are arranged in a boost converter topology.

6. The switched-mode power supply of claim 2, wherein the summation circuit is implemented using analog circuitry.

7. The switched-mode power supply of claim 1, wherein the secondary inductor is electromagnetically coupled with the primary inductor using a primary inductor to secondary inductor turns ration of more than ten (10).

8. A method of controlling a switched-mode power supply, comprising:

using a controlled switching device, inducing a primary inductor to carry a first varying current;

electromagnetically coupling the primary inductor with a secondary inductor to induce a second varying current that is substantially less than the first varying current in the secondary inductor and to induce the secondary inductor to produce a first varying voltage that is substantially proportional to the first varying current;

sensing a second varying voltage that is proportional to a low frequency varying current being supplied to a load of the switched-mode power supply; and, based on the second varying voltage and the first varying voltage, controlling the controlled switching device.

9. The method of claim 8, further comprising:

summing the second varying voltage with the first varying voltage to produce a varying feedback voltage.

10. The method of claim 8, wherein control circuitry executes firmware that sums a second varying voltage indicator with a first varying voltage indicator to produce a varying feedback indicator.

11. The method of claim 8, wherein the primary inductor and the controlled switching device are arranged in a buck converter topology.

12. The method of claim 8, wherein the primary inductor and the controlled switching device are arranged in a boost converter topology.

13. The method of claim 9, wherein summing the second varying voltage with the first varying voltage is performed using analog circuitry.

14. The method of claim 8, wherein the secondary inductor is electromagnetically coupled with the primary inductor using a primary inductor to secondary inductor turns ration of more than ten (10).

15. A switched-mode power supply, comprising:

a transformer having a primary winding and a secondary winding, the secondary winding configured to produce a first varying voltage that is substantially proportional to a varying current flowing in the primary winding;

a current sense element to produce a second varying voltage that is proportional to a low frequency varying current being supplied to a load of the switched-mode power supply; and, control circuitry configured to receive a first varying voltage and a second varying voltage and to, based on the first varying voltage and the second varying voltage, control a switching device that induces current changes in the primary winding.

16. The switched-mode power supply of claim 15, wherein the control circuitry further comprises:

a summation circuit to combine the second varying voltage with the first varying voltage to produce a varying feedback voltage.

17. The switched-mode power supply of claim 15, wherein the control circuitry executes firmware that combines a second varying voltage indicator with a first varying voltage indicator to produce a varying feedback indicator.

18. The switched-mode power supply of claim 15, wherein the primary winding and the controlled switching device are arranged in a buck converter topology.

19. The switched-mode power supply of claim 15, wherein the primary winding and the controlled switching device are arranged in a boost converter topology.

20. The switched-mode power supply of claim 16, wherein the summation circuit is implemented using analog circuitry.

* * * * *